Figure 1:
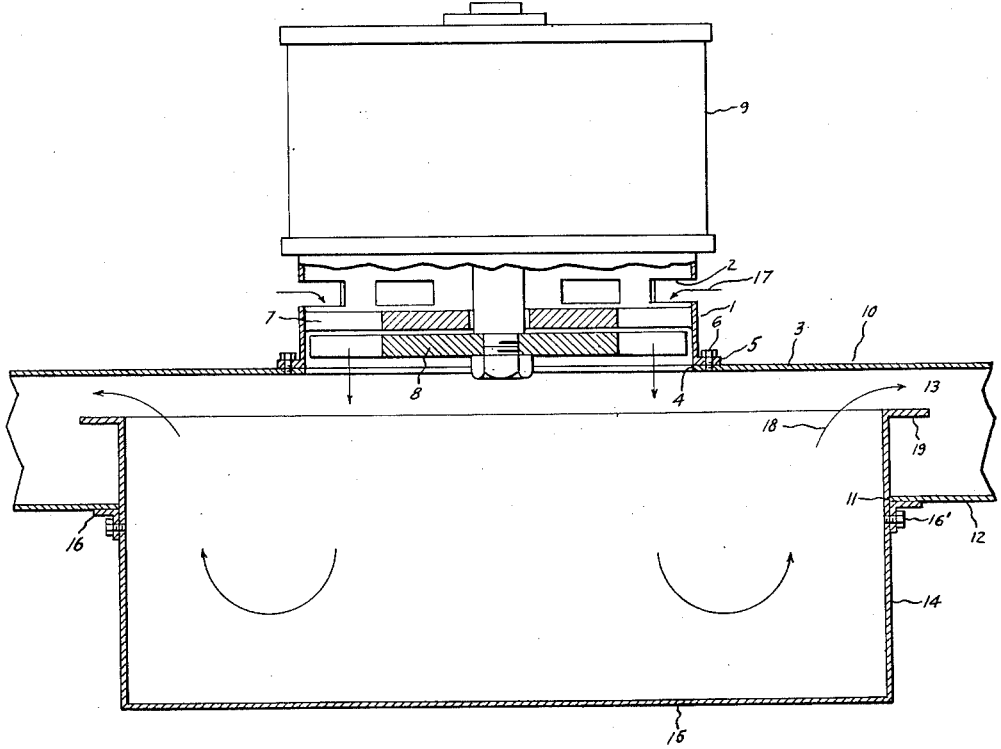

Inventor:
Fred B. Schneider,
by Purcell S. Mack
His Attorney.

2,797,859

VENTILATING DEVICE

Fred B. Schneider, Wesleyville, Pa., assignor to General Electric Company, a corporation of New York Application June 24, 1952, Serial No. 295,274

7 Claims. (Cl. 230—120)

This invention relates to ventilating devices and more particularly to a device arranged to deflect a flow of gaseous medium radially at right angles to the axis of its original flow without a drop in static pressure.

In the design of certain ventilating systems, for example, in self-propelled vehicles such as diesel-electric locomotives, it is desirable to utilize axial flow blowers mounted in the vehicle cab to furnish ventilating air for cooling the traction motors. This arrangement requires that the air discharged from the blower make a substantially right-angle turn into a duct arranged under the vehicle body floor. In the past, it has not been possible to force the air around this bend without a major pressure drop, thus resulting in a marked reduction in ventilating efficiency requiring, therefore, the use of excessively large blowers and driving motors. It is desirable, therefore, that a ventilating system be provided wherein the air from an axial flow blower is deflected at right angles into a duct without any drop in static pressure.

An object of this invention is therefore to provide an improved ventilating system incorporating the desirable feature pointed out above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides a substantially flat plate member, for example, the floor of the locomotive, having an opening formed therein. A first duct member communicates with this opening and is adapted to have a gaseous medium flowing therein toward the opening. A second duct member coaxial with the first duct member and having a closed end and an open end is provided arranged with the open end parallel with and spaced from the plate member so that the gaseous medium initially enters the second duct member and then escapes radially through the space between the second duct member and the plate member without loss of static pressure. More specifically, the first duct member may be cylindrical in form and have a plurality of openings formed adjacent one end with the other end communicating with an annular opening in the plate member. An axial flow blower is arranged in the cylindrical duct member intermediate the openings and the end communicating with the opening in the plate member and a motor may be arranged to close the upper end of the cylindrical member and connected to drive the axial flow blower. The second duct member may also be cylindrical in form and have a diameter substantially twice the diameter of the first duct member. The second duct member has a radially outwardly extending flange formed at its open end arranged parallel with and spaced from the plate member. In a locomotive construction, the floor of the locomotive body forms a hollow duct with the upper wall thereof having an annular opening formed therein with which the upper cylindrical duct member communicates. The lower wall of the floor has another annular opening formed therein substantially twice the diameter of the upper opening and the second cylindrical duct member extends through this outer opening with its end remote from the vehicle floor being closed. It will be seen that air is drawn into the upper duct member through the circumferential openings and forced by the axial flow blower into the second cylindrical duct member. Here the air decelerates in the increased volume available and escapes through the space between the rim of the second duct member and the plate member, i. e. through the interior of the vehicle body floor at right angles from the axial flow without any pressure drop.

Figure 2:
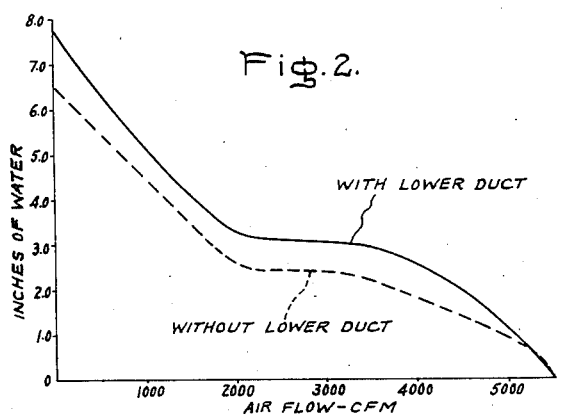

In the drawing, Fig. 1 is a side elevational view partly in section illustrating the improved ventilating system of this invention; and Fig. 2 is a chart graphically showing the static pressure of a ventilating device with and without the improved features of this invention.

In Fig. 1 of the drawing, a vertically arranged cylindrical duct member 1 is provided having a plurality of openings 2 formed in its circumferential surface adjacent its upper end. A horizontally arranged plate member 3 is provided, which may be the upper wall of a horizontally disposed duct member, for example the hollow floor of a vehicle body, with an annular opening 4 being formed therein. The lower end of the cylindrical duct member 1 communicates with the opening 4 and the duct member 1 is connected to the plate 3 by means of an annular flange 5 and suitable bolts 6. An axial flow blower is arranged in the cylindrical duct 1 intermediate the circumferential openings 2 and the annular opening 4 in plate 3, the blower comprising a plurality of stationary guiding vanes 7 arranged in front of an axial flow impeller 8. The impeller 8 is driven by a suitable driving motor 9 which is arranged to close the upper end of the cylindrical duct member 1.

The horizontally disposed duct member 10 of which the plate 3 forms the upper wall has its lower wall 12 provided with a circular opening 11, which opening is preferably substantially twice the diameter of the annular opening 4 in the upper wall 3. It will be readily seen that the lower wall 12 is spaced a predetermined distance from the upper wall 3 and connected thereto by the wall 13 thus defining a horizontal passage in the duct 10. Another cylindrical duct member 14 is provided positioned in opening 11. The lower end 15 of duct 14 is closed substantially below the wall 12 and a radially outwardly extending flange 19 is formed on its upper end within duct 10. The cylindrical duct member 14 is connected to the lower wall 12 of horizontal duct member 10 by means of an annular flange 16 and suitable bolts 16'.

In operation, air is drawn into the upper cylindrical duct member 1 through the circumferential openings 2 by the axial blower 8, as shown by the arrows 17. This air is discharged by the blower 8 in the form of a spiraling vortex into the lower cylindrical duct member 14. Here, the air decelerates in the increased volume available. Thus, this decelerated air is then deflected radially by the lower end 15 of the duct 14 with a decreased loss of kinetic energy. After the air is deflected it further decelerates and escapes radially into duct 10 between the upper wall 3 and flange 19 as shown by the arrows 18. The result is a reconversion of kinetic energy into static pressure with the final effect that the air escapes into the space between the open end of the cylindrical duct member 14 and the upper wall or plate 3 with no loss in static pressure, and even with a higher static pressure than it had when it was discharged by the blower 8. This phenomenon is readily explained by reference to Bernoulli's theorem in which it is stated that the sum of pressure energy, potential energy and kinetic energy equals a constant. Here, with potential energy remaining constant and the kinetic energy being reduced by virtue of the deceleration of the air, static pressure must necessarily increase in order to maintain the constant product of the equation. In the event that duct 10 is sufficiently shallow, duct 14 need not project therein, but the flange 19 may terminate at lower wall 12.

Referring now to Fig. 2, there is shown a chart plotting static pressure at some point within the duct 10, remote from the blower 8 in inches of water against air flow expressed in cubic feet per minute. This chart graphically illustrates the static pressure of the discharge of the axial flow blower 8 with and without the lower cylindrical duct or hood 14. In the absence of the duct 14, the lower wall 12 is not provided with an opening so that the space added by the duct 14 may not be utilized to decelerate the air prior to its deflection. It is readily seen that at an air flow of 3,000 cubic feet per minute, the static pressure with the lower duct or hood 14 is 3.1 inches of water while without the lower duct, the static pressure was 2.4 inches of water. Thus, it is seen that there is a pressure recovery of .7 inch of water by the addition of the lower duct or hood 14.

While the above description has referred to an air ventilating system, it will be readily apparent that the system is equally applicable to any gaseous medium. Since this construction decelerates the air to reduce the pressure drop in deflecting the gaseous medium around a 90° bend and then further decelerates the air to provide a static pressure recovery, a much smaller driving motor is needed to provide the same volume of air flow. Thus the entire device may be smaller in size for a given air volume compared with previous blower arrangements. In locomotive constructions, this device can be assembled inside of the cab for blowing traction motors with the axial flow blower being supported by the cylindrical duct member 1 which in turn rests directly on the under frame of the cab. The air thus flows vertically downward and then escapes horizontally and radially into the under frame which in turn carries the ventilating air to the traction motors of the locomotive.

While I have shown and described a particular embodiment of this invention, further modifications and improvements will occur to those skilled in the art. I desire it to be understood, therefore, that this invention is not limited to the form shown and I intend in the appended claims to cover all modifications which do not depart from the spirit and scope of this invention.

What I claim as new and desire to secure by Letters Patent of the United States is:

1. A device for deflecting a flow of gaseous medium radially at right angles to the axis of its original flow while maintaining static pressure comprising a first duct having an upper wall provided with a first opening and a lower wall provided with a second coaxial opening, means communicating with said first opening for forcing said gaseous medium to flow axially through said first opening toward said second opening, and a second duct attached to said lower wall and communicating with said second opening, said second duct having a closed end and an open end, said second duct being arranged with said closed end substantially below said lower wall and with said open end parallel to and spaced from said upper wall, said second opening and said second duct being larger than said first opening to allow said gaseous medium to initially enter said second duct at the center thereof from said first opening to decelerate and deflect in said second duct and then to approach said open end near the periphery of said second duct and escape radially into said first duct through the space between said open end of said second duct and said upper wall of said first duct.

2. A device for deflecting a flow of air radially at right angles to the axis of its original flow while maintaining static pressure comprising a first duct having a substantially flat upper wall provided with a first opening and a lower wall provided with a second coaxial opening, a second duct mounted on said first duct, communicating with said first opening and adapted to have said air flow axially therethrough toward said first and second openings, and a third duct mounted within said second opening and having a closed end and an open end, said third duct having a cross-sectional area substantially greater than the cross-sectional area of said second duct, said third duct being arranged with said closed end positioned substantially below said lower wall to provide a relatively static air cushion to decelerate said air therein and with said open end parallel with and spaced from said upper wall whereby said air initially enters said third duct, is deflected by said air cushion, and then escapes radially through the space between said open end of said third duct and said upper wall of said first duct.

3. A device for deflecting a flow of air radially at right angles to the axis of its original flow while maintaining pressure comprising a first duct having a substantially flat upper wall provided with a first circular opening formed therein and a lower wall, a second cylindrical duct arranged perpendicularly on said first duct and communicating with said opening, said second duct being adapted to have said gaseous medium flowing axially therein toward said opening, and a third cylindrical duct mounted in said lower wall of said first duct coaxial with said second duct, said third duct having its end remote from said upper wall closed substantially below said lower wall and its end toward said upper wall open with a radially outwardly extending flange formed thereon, said third duct having a diameter substantially twice the diameter of said second duct and being arranged with said flange parallel with and spaced between said upper wall and said lower wall whereby said air initially enters said third duct and then escapes radially through the space between said upper wall and said flange while maintaining static pressure.

4. A device for deflecting a flow of air radially at right angles to the axis of its original flow while maintaining pressure comprising a first duct having a substantially flat plate member provided with an opening therein and a lower wall, a second duct having one end communicating with said opening, an axial flow blower arranged in said second duct and adapted to draw said air into the other end of said second duct and to discharge said air axially toward said one end and said opening, and a third duct mounted in said lower wall coaxial with said second duct member and having a closed end substantially below said lower wall and an open end, said third duct being arranged with said open end thereof parallel with and spaced from said plate member whereby said air initially enters said third duct, decelerates in said third duct and then escapes radially through the space between said third duct and said plate member while maintaining static pressure.

5. A device for deflecting a flow of air radially at right angles to the axis of its original flow while maintaining static pressure comprising a first rectangular duct having a substantially flat upper plate member provided with a circular opening therein and a lower wall a predetermined distance from said plate member, a second cylindrical duct arranged perpendicular to said plate member and having one end communicating with said opening, an axial flow blower arranged in said second duct adapted to draw said air into the other end of said second duct and to discharge the same axially toward said one end and said opening, and a third cylindrical duct mounted in said lower wall on the side of said plate member remote from said second duct and coaxial therewith, said third duct having its end remote from said plate member extending below said lower wall and being closed and its end toward said plate member open with a radially outwardly extending flange formed thereon, said third duct having a diameter substantially twice the diameter of said second duct and being arranged with said flange parallel with and spaced from said plate member whereby said air initially enters said third duct, decelerates in said third duct, is deflected in said third duct, and then escapes radially through the space between said plate member and said flange.

6. A device for deflecting a flow of air radially at right angles to the axis of its original flow while maintaining static pressure comprising a first rectangular duct having a substantially flat upper plate member provided with a circular opening therein and a lower wall a predetermined distance from said plate member, a second cylindrical duct arranged on said first duct perpendicular to said plate member and having one end communicating with said opening, said second duct having a plurality of openings formed in its circumferential surface adjacent its other end, an axial flow blower arranged in said second duct intermediate said one end and said openings and adapted to draw said air into said first duct through said plurality of openings and to discharge the same axially toward said one end and said annular opening, a motor connected to drive said blower and mounted on said first duct member enclosing said other end of said second duct, said lower wall being provided with a circular opening coaxial with said second duct, and a third cylindrical duct mounted in said opening of said lower wall and coaxial with said second duct, said third duct having its end remote from said plate member arranged substantially below said lower wall and closed and its end toward said plate member open with a radially outwardly extending flange formed thereon, said third duct having a diameter substantially twice the diameter of said second duct so as to fill said opening of said lower wall and being arranged with said flange parallel with and spaced from said plate member whereby said air initially enters said third duct, substantially decelerates in said third duct, is deflected at a velocity substantially below the velocity in said second duct, further decelerates, and then escapes radially through the space between said plate member and said flange into said first duct.

7. A ventilating device comprising a first horizontally arranged duct having parallel spaced apart top and bottom walls, said top wall provided with a first circular opening therein, said bottom wall provided with a second circular opening formed therein coaxial with said first opening and having substantially twice the diameter of said first opening, said top and bottom walls being spaced apart a predetermined distance, a second cylindrical duct perpendicularly mounted on said top wall of said horizontal duct and having one end communicating with said first opening, an axial flow blower arranged in said second duct adapted to draw air into the other end of said second duct and to discharge the same toward said one end and said first opening, and a third cylindrical duct arranged on the side of said horizontal duct remote from said second duct and having one end communicating with said second opening, said third duct having its other end closed whereby said air initially enters said second duct member, decelerates in said third duct member and then escapes radially into said horizontal duct member while maintaining static pressure.

References Cited in the file of this patent

UNITED STATES PATENTS

| 2,562,996 | Winthrop | Aug. 7, 1951 |
| 2,616,617 | Hill | Nov. 4, 1952 |
| 2,638,835 | Strawsine | May 19, 1953 |

FOREIGN PATENTS

| 494,987 | Great Britain | of 1938 |